US012579972B2

(12) United States Patent
Jain et al.

(10) Patent No.: US 12,579,972 B2
(45) Date of Patent: ***Mar. 17, 2026

(54) METHOD AND APPARATUS FOR INTELLIGENT VOICE RECOGNITION

(71) Applicant: Comcast Cable Communications, LLC, Philadelphia, PA (US)

(72) Inventors: Navdeep Jain, Philadelphia, PA (US); Hongcheng Wang, Arlington, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,179

(22) Filed: Apr. 24, 2024

(65) Prior Publication Data

US 2024/0347046 A1      Oct. 17, 2024

Related U.S. Application Data

(63) Continuation of application No. 17/302,386, filed on Apr. 30, 2021, now Pat. No. 11,996,087.

(51) Int. Cl.
G10L 25/90 (2013.01)
G10L 15/10 (2006.01)
(Continued)

(52) U.S. Cl.
CPC .............. G10L 15/10 (2013.01); G10L 15/16 (2013.01); G10L 15/22 (2013.01); *G10L 25/90* (2013.01)

(58) Field of Classification Search
CPC ....................................................... G10L 25/90
See application file for complete search history.

(56) References Cited

U.S. PATENT DOCUMENTS

| | | | |
|---|---|---|---|
| 5,953,701 A | 9/1999 | Neti et al. | |
| 6,671,669 B1 | 12/2003 | Garudadri et al. | |

(Continued)

FOREIGN PATENT DOCUMENTS

| | | | | |
|---|---|---|---|---|
| CN | 105513597 A | 4/2016 | | |
| EP | 2048656 B1 * | 2/2010 | ............. | G10L 17/04 |

(Continued)

OTHER PUBLICATIONS

US Patent Application filed on Apr. 30, 2021, entitled "Method and Apparatus for Intelligent Voice Recognition", U.S. Appl. No. 17/302,386.

*Primary Examiner* — Feng-Tzer Tzeng
(74) *Attorney, Agent, or Firm* — BakerHostetler

(57) ABSTRACT

Methods and systems are described for recognizing, based on a voice input, a user and/or a voice command. An algorithm is described herein that processes data associated with a voice input. The data may indicate characteristics of the voice such as a gender, an age, or accent associated with the voice and other metadata. For example, the system may process the data and determine the gender of a voice. The determined characteristics may be used as an input into a voice recognition engine to improve the accuracy of identifying the user who spoke the voice input and identifying a voice command associated with the voice input. For example, the determined gender may be used as a parameter to improve the accuracy of an identified user (e.g., the speaker) or command. The algorithm may adjust, based on gender, parameters such as confidence thresholds used to match voices and voice commands.

20 Claims, 10 Drawing Sheets

(51) Int. Cl.
　　*G10L 15/16*　　　(2006.01)
　　*G10L 15/22*　　　(2006.01)

(56)　　　　　　References Cited

U.S. PATENT DOCUMENTS

| 7,401,017 B2 | 7/2008 | Murveit et al. |
| 7,475,015 B2 | 1/2009 | Epstein et al. |
| 7,502,736 B2 | 3/2009 | Hong et al. |
| 7,529,665 B2 | 5/2009 | Kim et al. |
| 7,865,368 B2 | 1/2011 | Li-Chun Wang et al. |
| 7,949,526 B2 | 5/2011 | Ju et al. |
| 8,010,358 B2 | 8/2011 | Chen |
| 8,296,383 B2 | 10/2012 | Lindahl |
| 8,831,942 B1 * | 9/2014 | Nucci ..................... G10L 25/90 |
| | | 704/250 |
| 8,965,764 B2 | 2/2015 | Ryu et al. |
| 9,262,612 B2 | 2/2016 | Cheyer |
| 9,484,030 B1 | 11/2016 | Meaney et al. |
| 9,633,660 B2 | 4/2017 | Haughay |
| 10,013,985 B2 | 7/2018 | Yue et al. |
| 10,121,471 B2 | 11/2018 | Hoffmeister et al. |
| 10,685,658 B2 | 6/2020 | Li et al. |
| 2003/0110038 A1 | 6/2003 | Sharma et al. |
| 2008/0195387 A1 | 8/2008 | Zigel et al. |
| 2009/0119103 A1 | 5/2009 | Gerl et al. |
| 2011/0153317 A1 | 6/2011 | Mao et al. |
| 2012/0209609 A1 | 8/2012 | Zhao et al. |
| 2013/0173267 A1 | 7/2013 | Washio |
| 2014/0172428 A1 | 6/2014 | Han |
| 2017/0270919 A1 | 9/2017 | Parthasarathi et al. |
| 2020/0045130 A1 | 2/2020 | Rastrow et al. |

FOREIGN PATENT DOCUMENTS

| EP | 2216775 A1 | 8/2010 |
| EP | 1904347 B1 | 9/2011 |
| EP | 3477505 A1 | 5/2019 |
| JP | 6705008 B2 | 6/2020 |
| KR | 10-2020-0012963 A | 2/2020 |
| WO | 2019/022722 A1 | 1/2019 |

* cited by examiner

400

700

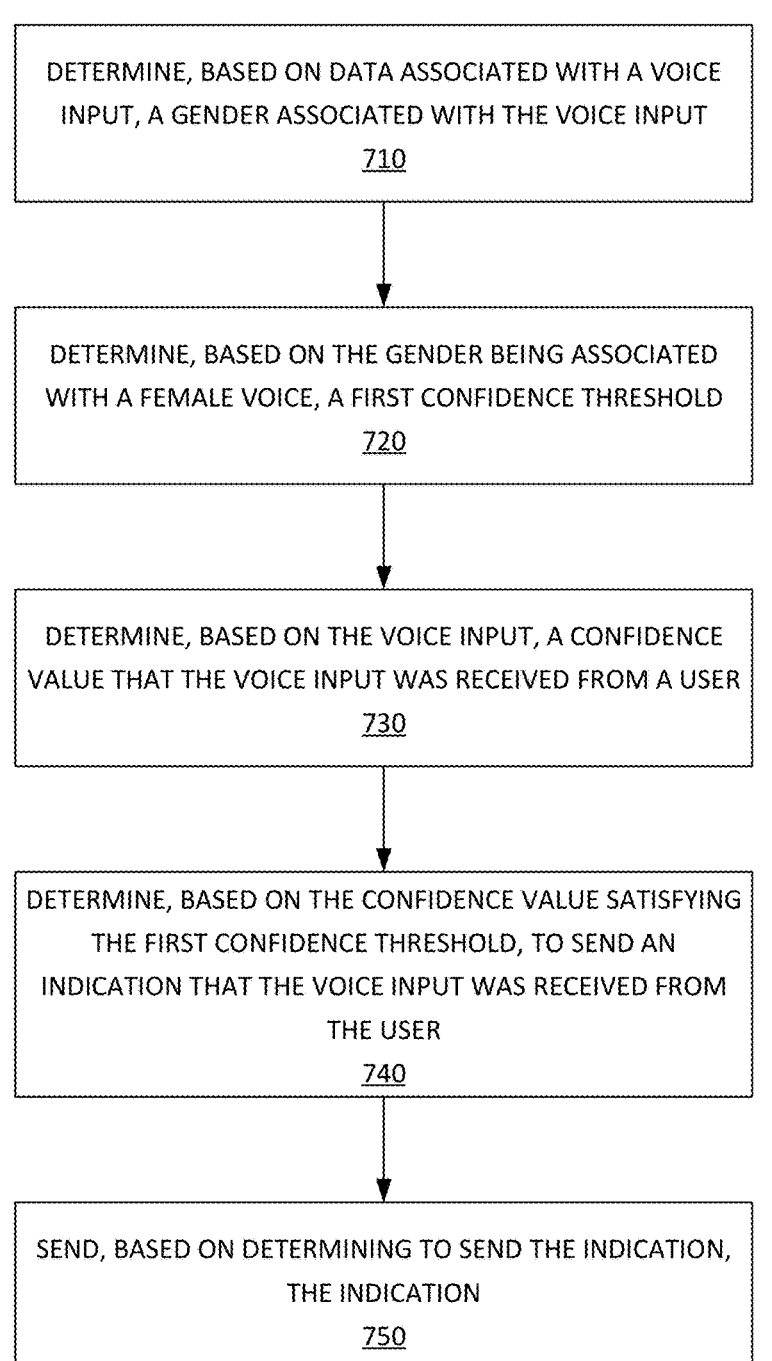

DETERMINE, BASED ON DATA ASSOCIATED WITH A VOICE INPUT, A GENDER ASSOCIATED WITH THE VOICE INPUT
710

DETERMINE, BASED ON THE GENDER BEING ASSOCIATED WITH A FEMALE VOICE, A FIRST CONFIDENCE THRESHOLD
720

DETERMINE, BASED ON THE VOICE INPUT, A CONFIDENCE VALUE THAT THE VOICE INPUT WAS RECEIVED FROM A USER
730

DETERMINE, BASED ON THE CONFIDENCE VALUE SATISFYING THE FIRST CONFIDENCE THRESHOLD, TO SEND AN INDICATION THAT THE VOICE INPUT WAS RECEIVED FROM THE USER
740

SEND, BASED ON DETERMINING TO SEND THE INDICATION, THE INDICATION
750

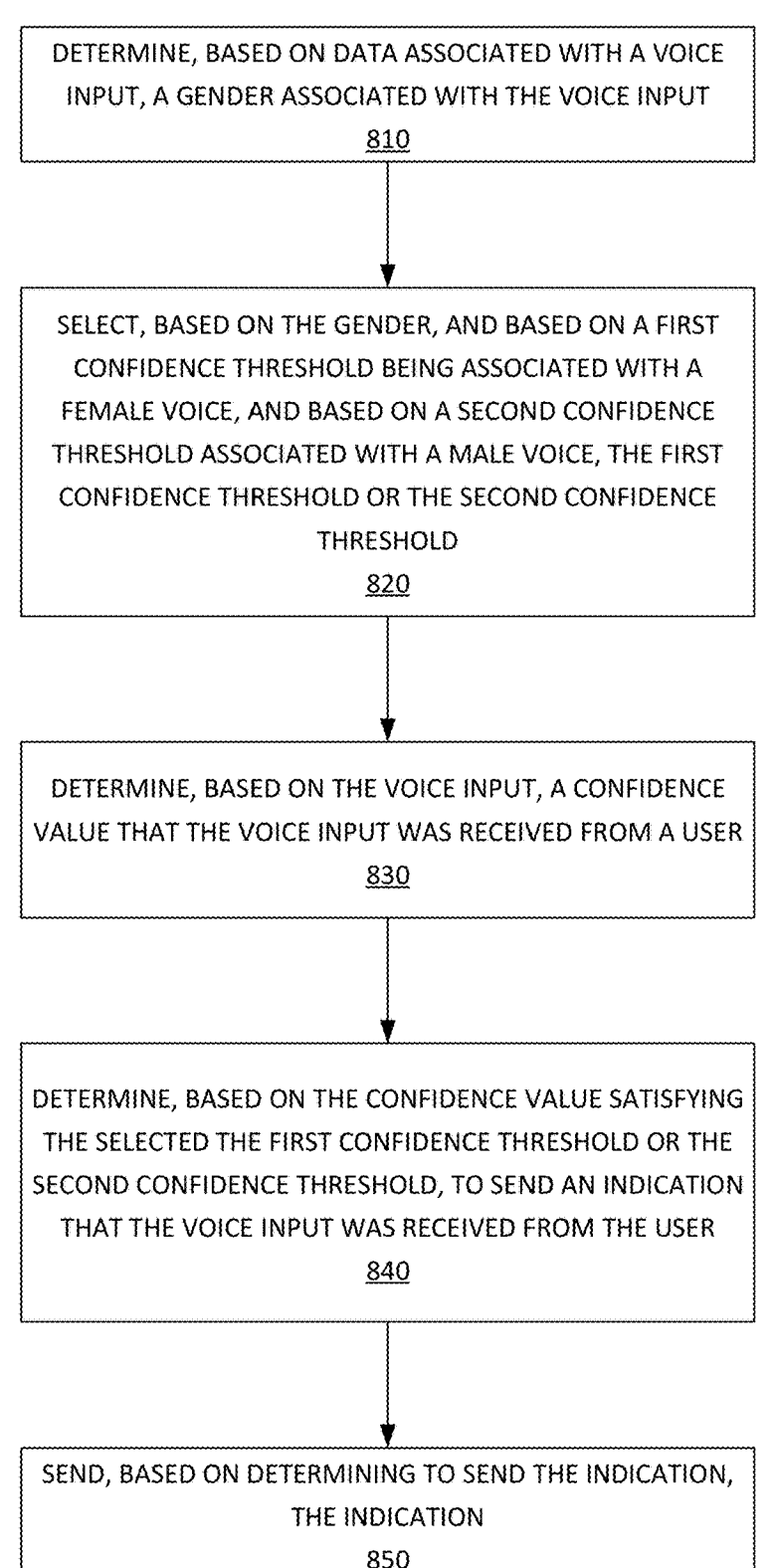

DETERMINE, BASED ON DATA ASSOCIATED WITH A VOICE INPUT, A GENDER ASSOCIATED WITH THE VOICE INPUT
810

SELECT, BASED ON THE GENDER, AND BASED ON A FIRST CONFIDENCE THRESHOLD BEING ASSOCIATED WITH A FEMALE VOICE, AND BASED ON A SECOND CONFIDENCE THRESHOLD ASSOCIATED WITH A MALE VOICE, THE FIRST CONFIDENCE THRESHOLD OR THE SECOND CONFIDENCE THRESHOLD
820

DETERMINE, BASED ON THE VOICE INPUT, A CONFIDENCE VALUE THAT THE VOICE INPUT WAS RECEIVED FROM A USER
830

DETERMINE, BASED ON THE CONFIDENCE VALUE SATISFYING THE SELECTED THE FIRST CONFIDENCE THRESHOLD OR THE SECOND CONFIDENCE THRESHOLD, TO SEND AN INDICATION THAT THE VOICE INPUT WAS RECEIVED FROM THE USER
840

SEND, BASED ON DETERMINING TO SEND THE INDICATION, THE INDICATION
850

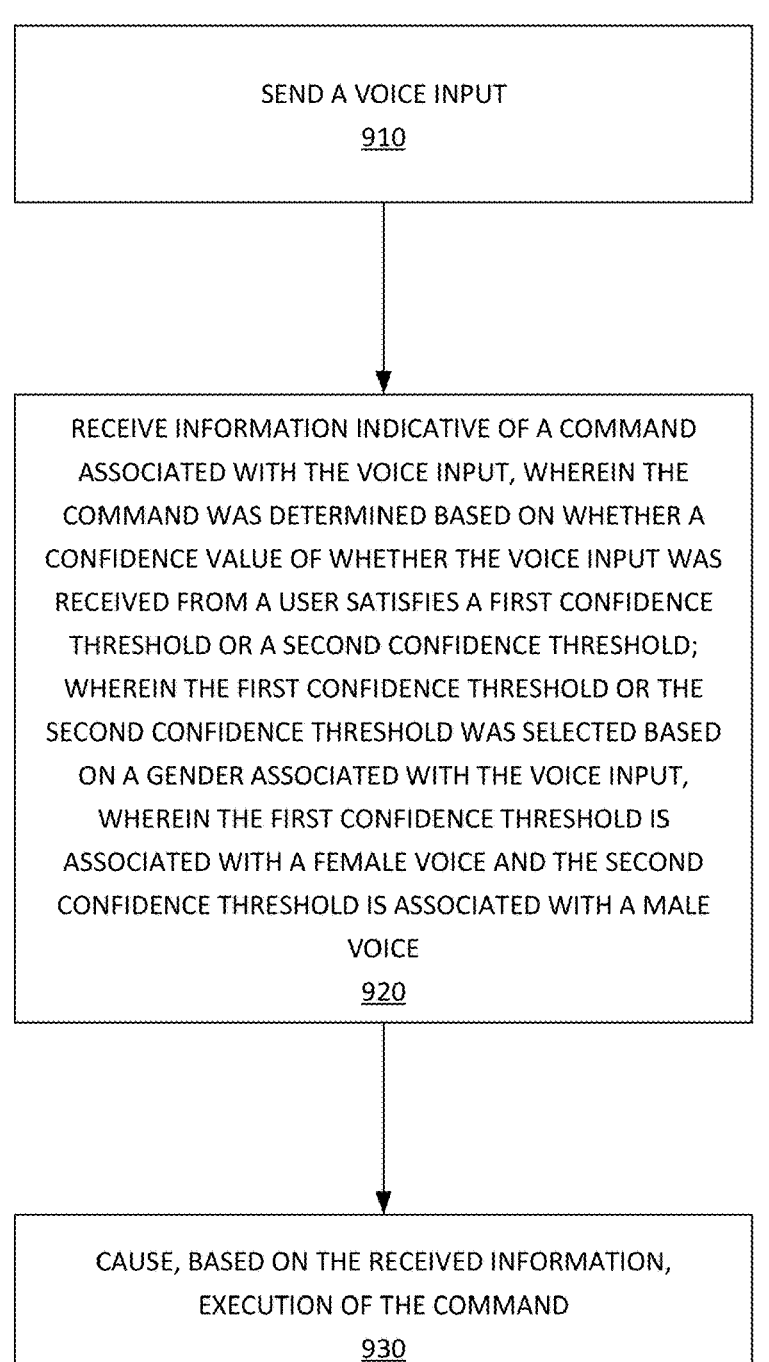

SEND A VOICE INPUT
910

RECEIVE INFORMATION INDICATIVE OF A COMMAND
ASSOCIATED WITH THE VOICE INPUT, WHEREIN THE
COMMAND WAS DETERMINED BASED ON WHETHER A
CONFIDENCE VALUE OF WHETHER THE VOICE INPUT WAS
RECEIVED FROM A USER SATISFIES A FIRST CONFIDENCE
THRESHOLD OR A SECOND CONFIDENCE THRESHOLD;
WHEREIN THE FIRST CONFIDENCE THRESHOLD OR THE
SECOND CONFIDENCE THRESHOLD WAS SELECTED BASED
ON A GENDER ASSOCIATED WITH THE VOICE INPUT,
WHEREIN THE FIRST CONFIDENCE THRESHOLD IS
ASSOCIATED WITH A FEMALE VOICE AND THE SECOND
CONFIDENCE THRESHOLD IS ASSOCIATED WITH A MALE
VOICE
920

CAUSE, BASED ON THE RECEIVED INFORMATION,
EXECUTION OF THE COMMAND
930

FIG. 9

METHOD AND APPARATUS FOR INTELLIGENT VOICE RECOGNITION

CROSS-REFERENCE TO RELATED APPLICATIONS

This application is a continuation of U.S. application Ser. No. 17/302,386 filed Apr. 30, 2021, now U.S. Pat. No. 11,996,087, which is incorporated herein by reference in its entirety.

BACKGROUND

Voice recognition systems may recognize who is speaking based on an audio signal produced by the speaker's voice. These systems may be used in many applications that identify a user based on their voice including, but not limited to, content selection and playback, content personalization, customer service, or home automation. These systems may fail to identify users based on shorter utterances and may be inaccurate for some users. These systems may also rely on long and multiple enrollment sentences to generate a voice identity for a user resulting in the discouragement of the user to sign up for a voice identity based service. Most voice recognition algorithms have some difficulty to distinguishing children's voices or voices of different genders. Accordingly, more efficient methods for voice recognition are desired.

SUMMARY

This Summary is provided to introduce concepts that are further described herein. This Summary is not intended to be used to limit the scope of the claimed subject matter.

Methods and systems are described for recognizing, based on a voice input, a user and/or a voice command. An algorithm is described herein that processes data associated with a voice input. The data may indicate characteristics of the voice such as a gender, age, or accent associated with the voice and other metadata. The system may process the data and determine the characteristics of the voice. For example, the system may process the data and determine the gender of a voice. The determined characteristics may be used as an input into a voice recognition engine to improve the accuracy of identifying the user who spoke the voice input and identifying a voice command associated with the voice input. For example, the determined gender may be used as a parameter to improve the accuracy of an identified user (e.g., the speaker) or to improve the accuracy of a recognized voice command. A different confidence threshold may be needed for an accurate match if the captured audio is determined to be a male voice or a female voice. As a result, the algorithm may adjust parameters such as confidence thresholds used to match voices and voice commands in order to verify/authenticate users and process commands. For example, the adjustment may be based on parameters associated with the user's voice such as gender, age, or accent.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings:

FIG. 7 shows an example method;
FIG. 8 shows an example method;
FIG. 9 shows an example method.

DETAILED DESCRIPTION OF ILLUSTRATIVE EMBODIMENTS

Figure 1:
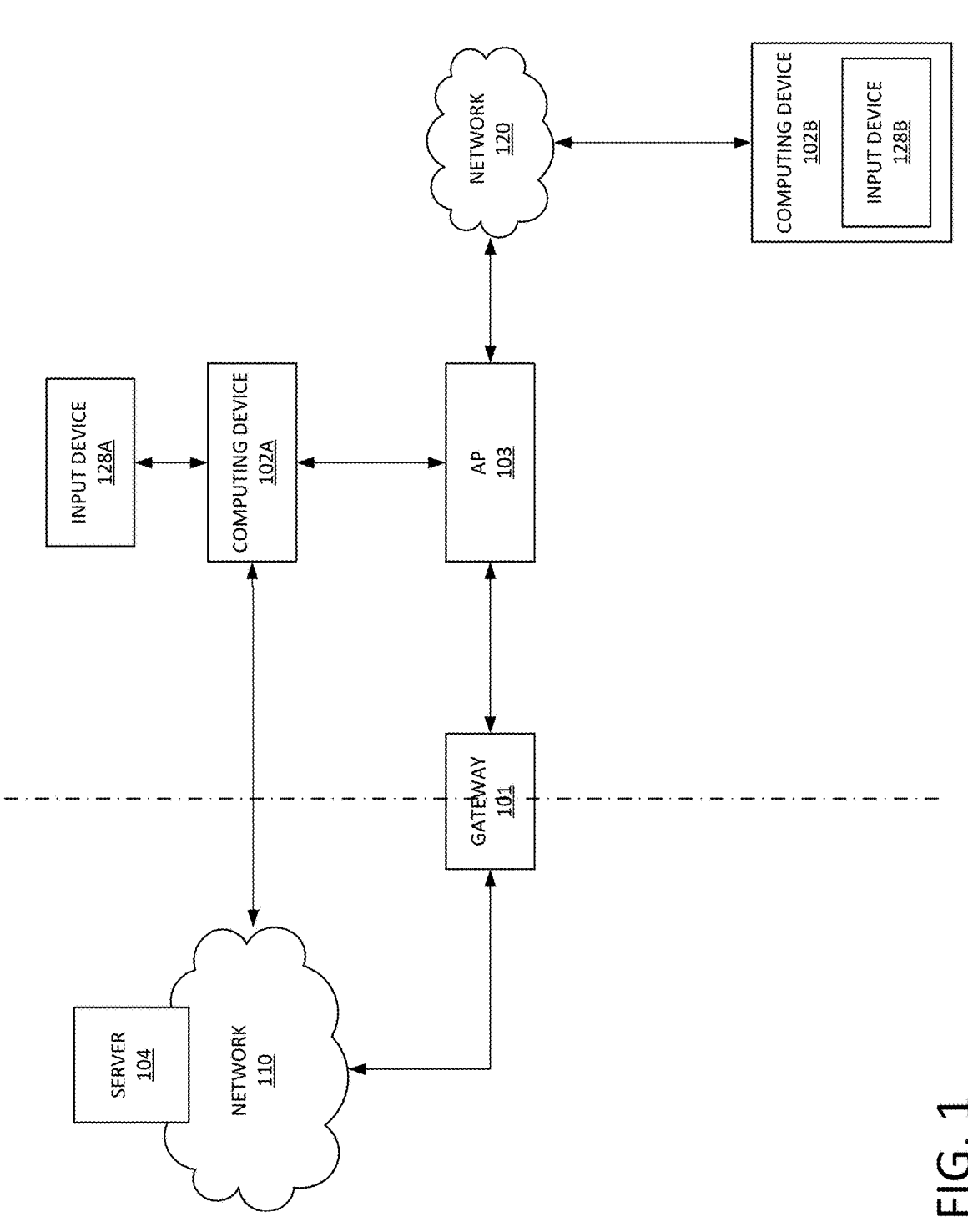
FIG. 1 shows an example system.

Systems and methods are described herein for recognizing a user based on their voice and recognizing voice commands. The system may recognize a user that spoke a voice input in order to verify the user or enroll the user. The system may recognize a voice command associated with the voice input in order to accurately process the command. The system may recognize users and voice commands based on an algorithm that processes data associated with voice inputs. The data may indicate characteristics of the voice such as the gender of the voice. The data may also comprise stored historical data of previous voice commands. The system may determine, based on the data, the gender of a voice. The determined gender may be used as a parameter in determining a confidence threshold of the recognized voice and/or voice command. For example, a different confidence threshold may be needed for an accurate match if the captured audio is determined to be a male voice or a female voice. The data may also indicate age, accent, or another characteristic of the voice. The data may be used as a parameter in determining the confidence threshold. Based on the determined command and/or determined user, an action may be taken. For example, the action may comprise at least one of: verifying the user's identity, selecting content, personalizing content, responding to a system query, etc.

As used herein, equal error rate refers to a value indicating when the proportion of false rejections is the same as the proportion of false acceptances. Accordingly, the equal error rate refers to when the false acceptance rate (FAR) and false rejection rate (FRR) are equal. Accuracy is optimal when the system is achieving an equal error rate. The system may determine the threshold value at which there is an equal error rate for FAR and FRR. Using the techniques described herein, the system may determine a threshold value, at which there is an the equal error rate for FAR and FRR, that is different for different genders. The different thresholds may indicate a degree of accuracy that is needed to match the data, indicating characteristics of the voice, with a particular user (e.g., the speaker of the voice input) and/or with a particular voice command. The confidence thresholds may minimize a FAR or a FRR associated with a determined voice or voice command.

For example, the system may process a received voice input and determine a user (e.g., the speaker of the voice) based on the received voice input. The voice input may comprise data. The data may be indicative of characteristics of the voice such as a gender, age, or accent associated with the voice and other metadata. For example, the characteristics may indicate features, for example, that are associated with the frequency domain or time domain. The frequency domain features may comprise, for example, one or more frequencies, a range of frequencies, a pitch, or other spectral information. The time domain features may comprise, for example, one or more amplitudes or an average amplitude.

The system may also determine the voice based on a fingerprint generated during a user enrollment process. The system may determine, based on the data, a gender of a voice. The determined gender may be used as a parameter in determining a confidence threshold of the recognized voice and/or voice command. The system may use the determined confidence threshold in combination with the fingerprint to determine the user. For example, the a higher confidence threshold may be determined for a female voice than a male voice. A confidence value associated with the voice input may be determined and compared to the determined confidence threshold. If the confidence value associated with the voice input satisfies the determined confidence threshold, the user may be determined. Based on the determined user, the system may verify the user's identity, authenticate the user, etc.

For example, the system may process a received voice input and determine a voice command based on the received voice input. The voice input may comprise data. The data may be indicative of characteristics of the voice such as a gender, age, or accent associated with the voice and other metadata. For example, the characteristics may indicate features, for example, that are associated with the frequency domain or time domain. The frequency domain features may comprise, for example, one or more frequencies, a range of frequencies, a pitch, or other spectral information. The time domain features may comprise, for example, one or more amplitudes or an average amplitude. The system may also determine the voice command based on a fingerprint generated during a user enrollment process. The system may determine, based on the data, a gender of a voice. The determined gender may be used as a parameter in determining a confidence threshold of the recognized voice and/or voice command. The system may use the determined confidence threshold in combination with the fingerprint to determine the voice command. For example, the a higher confidence threshold may be determined for a female voice than a male voice. A confidence value associated with the voice input may be determined and compared to the determined confidence threshold. If the confidence value associated with the voice input satisfies the determined confidence threshold, the voice command may be determined. Based on the determined command, the system may select content, personalize content, respond to a system query, etc.

User enrollment may be based on an implicit fingerprint in addition to explicit enrollment commands. The explicit enrollment commands may comprise one or more sentences, which may include repeated sentences. The voice commands processed by the system to generate an implicit fingerprint may comprise shorter utterances. The voice commands may be processed by a machine learning algorithm, and the implicit fingerprint may be generated based on the processed voice commands. The machine learning algorithm may comprise an unsupervised machine learning algorithm such as a clustering algorithm.

During enrollment, a fingerprint generated from an enrollment sentence may be matched with the implicit fingerprint generated using the machine learning algorithm. If fingerprint generated from an enrollment sentence matches an existing implicit fingerprint, the user is not prompted to speak additional enrollment sentences making enrollment more convenient for users. New users may be prompted to say enrollment sentences one or more times. For both existing and new users, their voice fingerprints are continually updated with voice commands spoken by them as identified by the algorithm to improve identification at shorter sentences.

FIG. 1 shows an example system 100. The computing devices 102a and 102b may comprise transmitters, receivers, and/or transceivers for communicating via a network 120 and/or a network 110. An access point (AP) 103 may send signals, to the computing devices 102a and 102b, via the network 120. The AP 103 may receive signals, from the computing devices 102a and 102b, via the network 120. The computing devices 102a and 102b may comprise, for example, smartphones, tablets, laptop computers, handheld computers, desktop computers, set top boxes or any other computing devices capable of operating in the network 120 and/or the network 110.

The system 100 may comprise a gateway 101. The gateway 101 may send signals via the network 110. The network 110 may comprise a network such as the Internet or any other network described herein. The gateway 101 may operate as a wireless local area network (WLAN) router and cable modem. The AP 103 may communicate with the gateway 101 to provide Wi-Fi communications via network 120. The gateway 101 and AP 103 may be part of the same device and are depicted separately in FIG. 1 as an example. The AP 103 may comprise one or more radios each comprising transmitters, receivers, and/or transceivers for communicating via the network 120. The network 120 may comprise a Wi-Fi network. The network 120 may communicate using technologies such as WLAN technology based on the Institute of Electrical and Electronics Engineers (IEEE) 802.11 standards or any other appropriate technologies.

The computing devices 102a may be associated with an input device 128a. Input device 128a may receive sources of user inputs such data indicative of a voice input. By way of non-limiting example, input devices 128a may comprise one or more of a microphone, a cable set-top box remote control, an internal microphone, or any other device capable of receiving a user input such as a voice command and capable of communicating with the computing device 102a. The input devices 128a may be configured to transmit (e.g., streams, file transfers, etc.) audio data of the voice input to a system where it may be processed to determine a command associated with the voice input. For example, the computing device 102a may comprise a set top box and the input device 128a may comprise a cable set-top box remote control. A user of the computing device 102a and the input device 128a may speak a voice command, such as "tune to channel 1." A microphone in the input device 128a may capture the voice command in the form of an audio file. The computing device 102a may send, via network 110 the audio file to a server 104 to cause the voice command to be processed in accordance with the techniques disclosed herein.

The computing devices 102b may be associated with an input device 128b. Input device 128b may receive sources of user inputs such data indicative of a voice input. By way of non-limiting example, input devices 128b may comprise one or more of a microphone, a cable set-top box remote control, an internal microphone, or any other device capable of receiving a user input such as a voice command and capable of communicating with the computing device 102b. The input devices 128b may be configured to transmit (e.g., streams, file transfers, etc.) audio data of the voice input to a system where it may be processed to determine a command associated with the voice input. For example, the computing device 102b may comprise a tablet and the input device 128b may comprise an internal microphone. A user of the computing device 102b and the input device 128b may speak a voice command to request content. The input device 128b may capture the voice command in the form of an audio file.

The computing device 102*b* may send, via network 120 the audio file to the server 104 to cause the voice command to be processed in accordance with the techniques disclosed herein.

Figure 2:
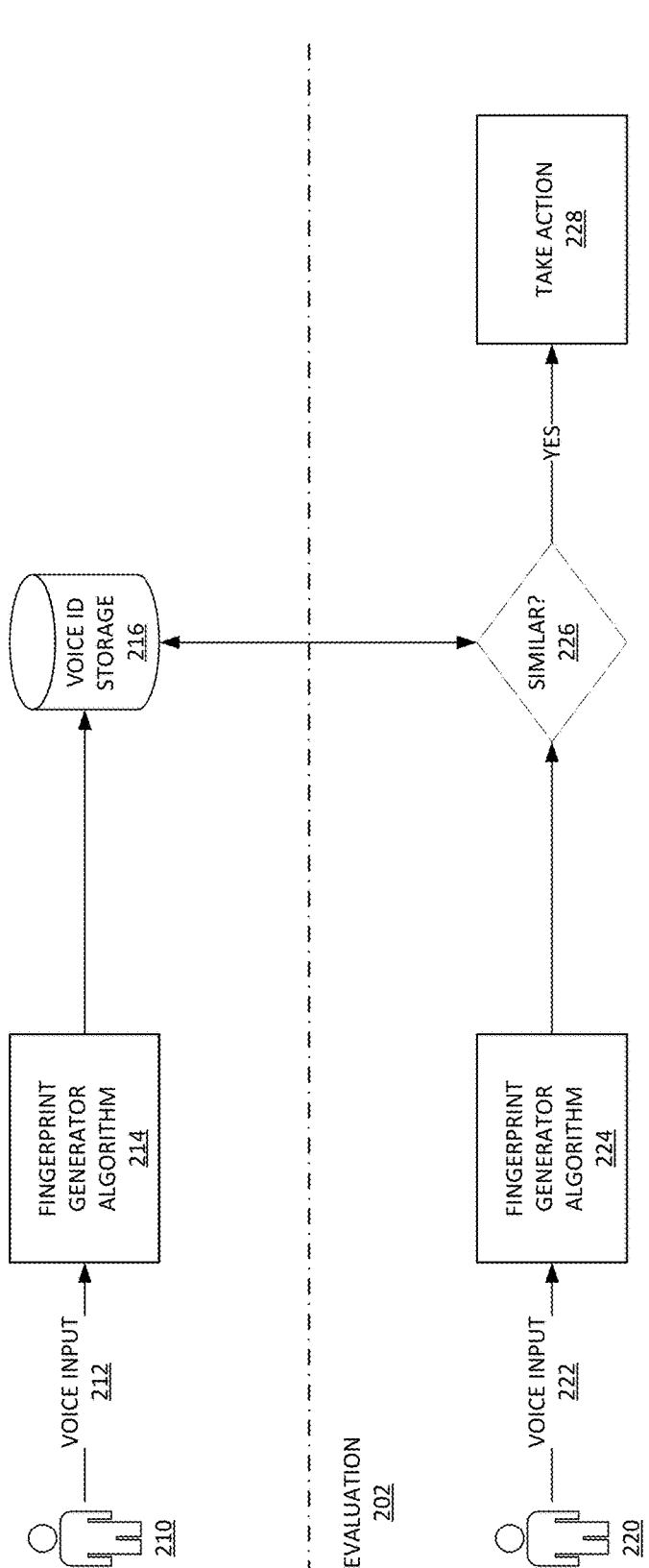
FIG. 2 shows an example system.

FIG. 2 comprises an example system 200. The system 200 may be configured to process voice inputs 212 and 222 and determine a voice command based on the received voice input to take an action 228 associated with the voice command. User enrollment 201 may be based on explicit enrollment commands in voice input 212. The explicit enrollment commands may comprise one or more sentences, which may include repeated sentences. During enrollment 201, a fingerprint may be generated by a fingerprint generator algorithm 214 from the enrollment commands. The fingerprint may comprise features associated with the voice of the user 210 that may be used to identify the user 210. The features may comprise features in the frequency domain or time domain. The frequency domain features may comprise, for example, one or more frequencies, a range of frequencies, a pitch, or other spectral information. The time domain features may comprise, for example, one or more amplitudes or an average amplitude. The generated fingerprint may be stored in voice ID storage 216.

Voice command evaluation 202 may process a voice input 222 from a user 220. The voice input 222 may comprise one or more voice commands. A fingerprint may be generated by a fingerprint generator algorithm 224 from the voice input 222. The fingerprint may comprise features associated with the voice of the user 220 that may be used to identify the user 220. The features may comprise features, for example, that are associated with the frequency domain or time domain. The frequency domain features may comprise, for example, one or more frequencies, a range of frequencies, a pitch, or other spectral information. The time domain features may comprise, for example, one or more amplitudes or an average amplitude. The system 200 may determine whether the fingerprint generated by the fingerprint generator algorithm 224 is similar 226 to a fingerprint stored in voice ID storage 216. If the fingerprint generated by the fingerprint generator algorithm 224 is similar 226 to a fingerprint stored in voice ID storage 216, the system may recognize the user 220 as an enrolled user and may determine the content of the voice command associated with the voice input 222.

Figure 3:
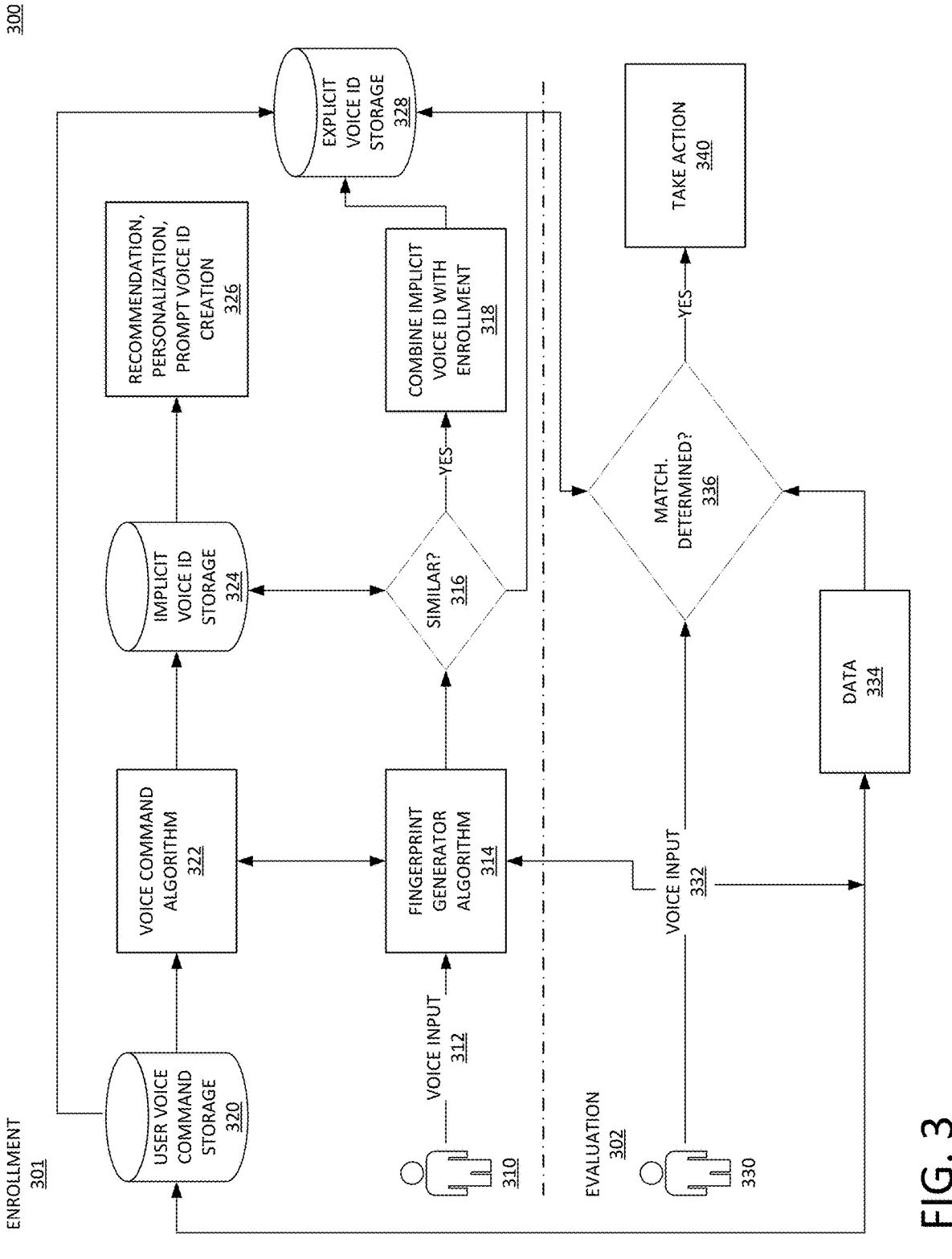
FIG. 3 shows an example system.

FIG. 3 comprises an example system 300. The system 300 may be configured to process voice inputs 312 and 332 and determine a user (e.g., the speaker of the voice) and determine a voice command based on the received voice input to take an action 340 (e.g., perform an action associated with the voice command). User enrollment 301 may be based on an implicit fingerprint in addition to explicit enrollment commands in voice input 312. During enrollment 301, a fingerprint may be generated by a fingerprint generator algorithm 314 from the voice input 312. The fingerprint may comprise features associated with the voice of the user 310 that may be used to identify the user 310. The features may comprise features, for example, that are associated with the frequency domain or time domain. The frequency domain features may comprise, for example, one or more frequencies, a range of frequencies, a pitch, or other spectral information. The time domain features may comprise, for example, one or more amplitudes or an average amplitude. The fingerprint generator algorithm 314 may send short utterances or phrases in the voice input 312 to a voice command algorithm 322. The voice command algorithm 322 may comprise a machine learning algorithm. The machine learning algorithm may comprise an unsupervised machine learning algorithm such as a clustering algorithm.

The voice command algorithm 322 may generate an implicit fingerprint based on processing the features indicated by the short utterances or phrases in the voice input 312 and historical data such as previous voice commands stored in user voice command storage 320. The implicit fingerprint may be stored in implicit voice ID storage 324. The stored implicit fingerprints may be used to prompt the user 310 to personalize content and create a voice ID 326.

The fingerprint generator algorithm 314 may process explicit enrollment commands that comprise one or more sentences, which may include repeated sentences. The system 300 may determine whether the processed explicit enrollment commands include data that satisfies a confidence threshold indicating that the data is similar/matches 316 data stored in implicit voice ID storage 324. If the processed explicit enrollment commands include data that satisfies a confidence threshold indicating that the data is similar/matches 316 data stored in implicit voice ID storage 324, the system may recognize the user 312 and may combine the recognized voice ID with the processed explicit command to enroll the user 310. The matched implicit voice ID and the processed explicit enrollment commands used for enrollment may be stored in explicit voice ID storage.

Voice command evaluation 302 may process a voice input 332 from a user 330. The voice input 332 may, for example, comprise a voice command. The system 300 may determine data 334 associated with the voice input 332. A fingerprint may be generated by the fingerprint generator algorithm 314 from the voice input 332, in accordance with the techniques described above. The data 334 may indicate characteristics of the voice of the user 330 such as a gender, age, accent associated with the voice, or other characteristic and other metadata. For example, the characteristics may indicate features, for example, that are associated with the frequency domain or time domain. The frequency domain features may comprise, for example, one or more frequencies, a range of frequencies, a pitch, or other spectral information. The time domain features may comprise, for example, one or more amplitudes or an average amplitude. The data 334 may be processed by a machine learning algorithm. The machine learning algorithm may comprise a machine learning algorithm such as a supervised classifier algorithm or a neural network. The system 300 may determine, based on the data 334 processed by the machine learning algorithm, a gender associated with the voice. The system 300 may determine, based on the data 334 processed by the machine learning algorithm, an age associated with the voice. The system 300 may determine, based on the data 334 processed by the machine learning algorithm, an accent associated with the voice. The system 300 may determine, based on the data 334 processed by the machine learning algorithm, another characteristic or metadata associated with the voice.

The system 300 may determine a confidence threshold of the voice command based on the determined gender, age, accent, or other characteristic. As used herein, equal error rate refers to a value indicating when the proportion of false rejections is the same as the proportion of false acceptances. The equal error rate refers to when the FAR and FRR are equal. The system 300 may determine the threshold value at which there is an the equal error rate for FAR and FRR. The system may determine a threshold value, at which there is an the equal error rate for FAR and FRR, and that threshold value may be different for different genders. For example, the threshold value may be higher for female voices. The different thresholds may indicate a degree of accuracy that is needed to match the data 334 with a particular voice (e.g., a particular speaker) and/or voice command. The confidence thresholds may minimize a FAR or a FRR associated with a determined voice command. For example, a higher confidence threshold may be needed for an accurate match if the voice input 332 is determined to be a male voice or a female voice. The data 334 may also indicate an age determine the confidence threshold based on the age.

The system 300 may determine, based on the data 334 and determined confidence threshold, a user (e.g., the speaker of the voice) and/or the voice command 336 associated with the voice input 332. Based on the voice command, the system 300 may take action 340. The system may also determine, based on the data 334 and explicit voice IDs stored in explicit voice ID storage 328, whether the voice input 332 is similar to an enrolled user. The system 300 may optimize the accuracy of the determined user and/or voice command by combining the data 334, determined confidence thresholds, and user enrollment information stored in explicit voice ID storage 328.

Figure 4:
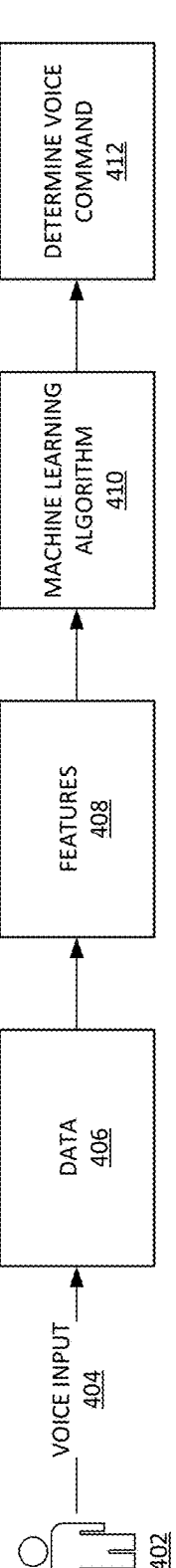
FIG. 4 shows an example method.

FIG. 4 shows an example method 400. A voice input 404 may be received by the system 400. Data 406 may be determined based on the voice input 404. Features 408 may be extracted from the data that indicate characteristics of the voice of a user 402 and other metadata. The features 408, for example, may comprise features that are associated with the frequency domain or time domain. The frequency domain features may comprise, for example, one or more frequencies, a range of frequencies, a pitch, or other spectral information. The time domain features may comprise, for example, one or more amplitudes or an average amplitude. The features 408 may be used by a machine learning algorithm 410 to determine various data about the user 402 such as gender, age, accent associated with the voice, or other characteristic. For example, a gender classification algorithm may determine, based on the data associated with the voice input 404, a gender, age, or accent associated with the user 402. A confidence threshold may be determined based on the determined gender, age, and/or accent. The confidence thresholds may indicate a degree of accuracy needed to match the data 406 with a voice command. The confidence thresholds may minimize a FAR or an FRR associated with a determined voice command 412.

Figure 5:
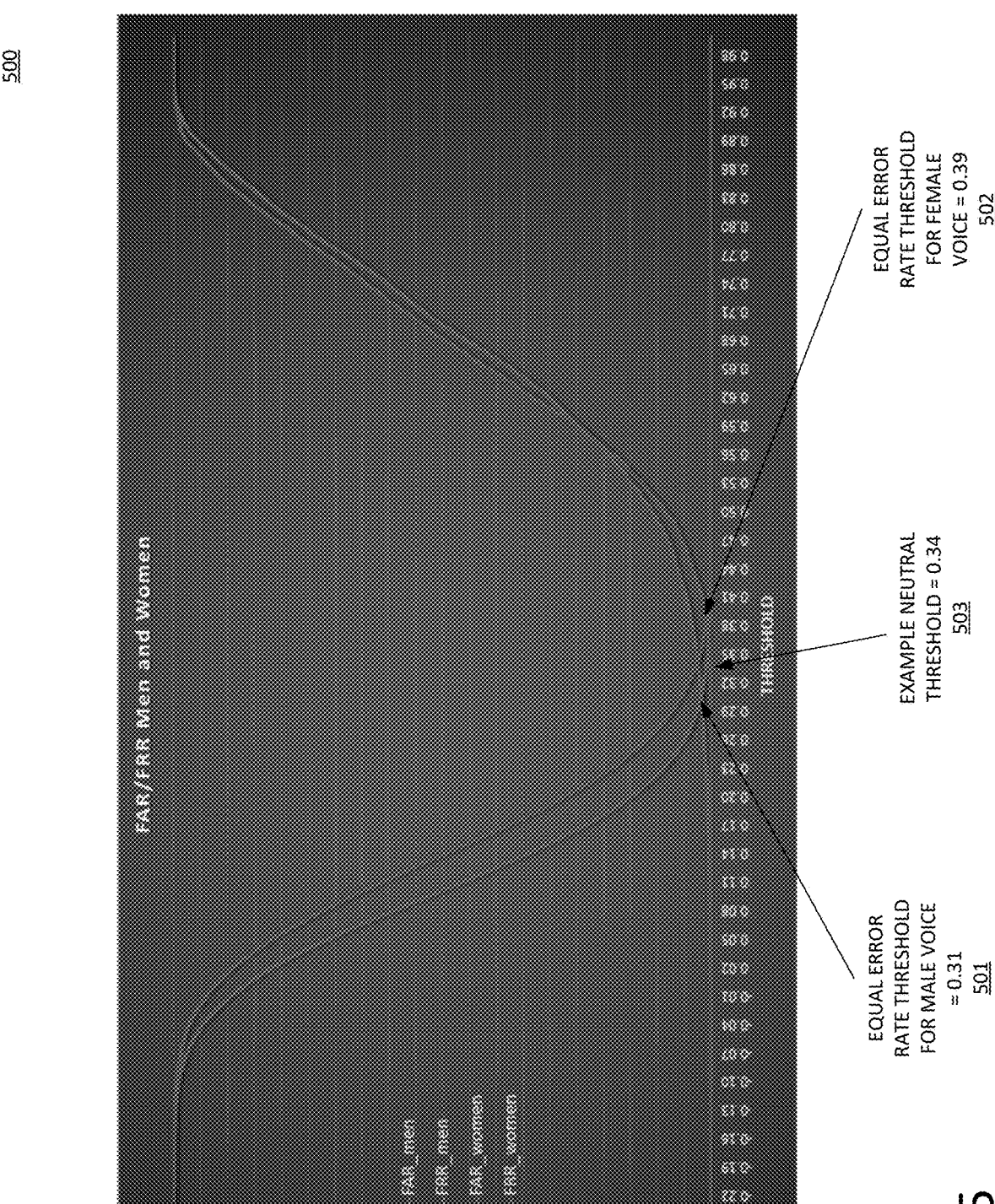
FIG. 5 shows example data.

FIG. 5 shows example data 500. As described above, the value indicating when the proportion of false rejections is the same as the proportion of false acceptances is referred to herein as the equal error rate. The equal error rate refers to when the FAR and FRR are equal. The example data 500 depicts that the threshold value, at which there is an the equal error rate for FAR and FRR, are different for different genders. For example, the threshold 501 at which there is an equal error rate threshold for FAR and FRR for males is 0.31. Any other threshold used in the system depicted herein would have increased error rates (e.g., increased FAR and/or FRR) for males. For example, the threshold 502 at which there is an equal error rate threshold for FAR and FRR for females is 0.39. Any other threshold used in the system depicted herein would have increased error rates (e.g., increased FAR and/or FRR) for females.

As a result, if the same confidence threshold (e.g., neutral threshold) was used for both genders, the rate of falsely accepted voice commands would increase for one of the genders and would result in poor system performance. For example, if a neutral threshold 503 was used for every voice input without the use of gender data (e.g., a threshold 603 of 0.34), at this point FRR would be higher for males than is optimal, and the FAR would be higher for females than is optimal. For example, a user may be incorrectly identified, or a voice command may be incorrectly identified. The techniques disclosed herein for determining data associated with a voice input such as gender and determining different thresholds based on the determined gender improves system performance by, for example, reducing error rates for specific genders and improving overall accuracy.

Figure 6:
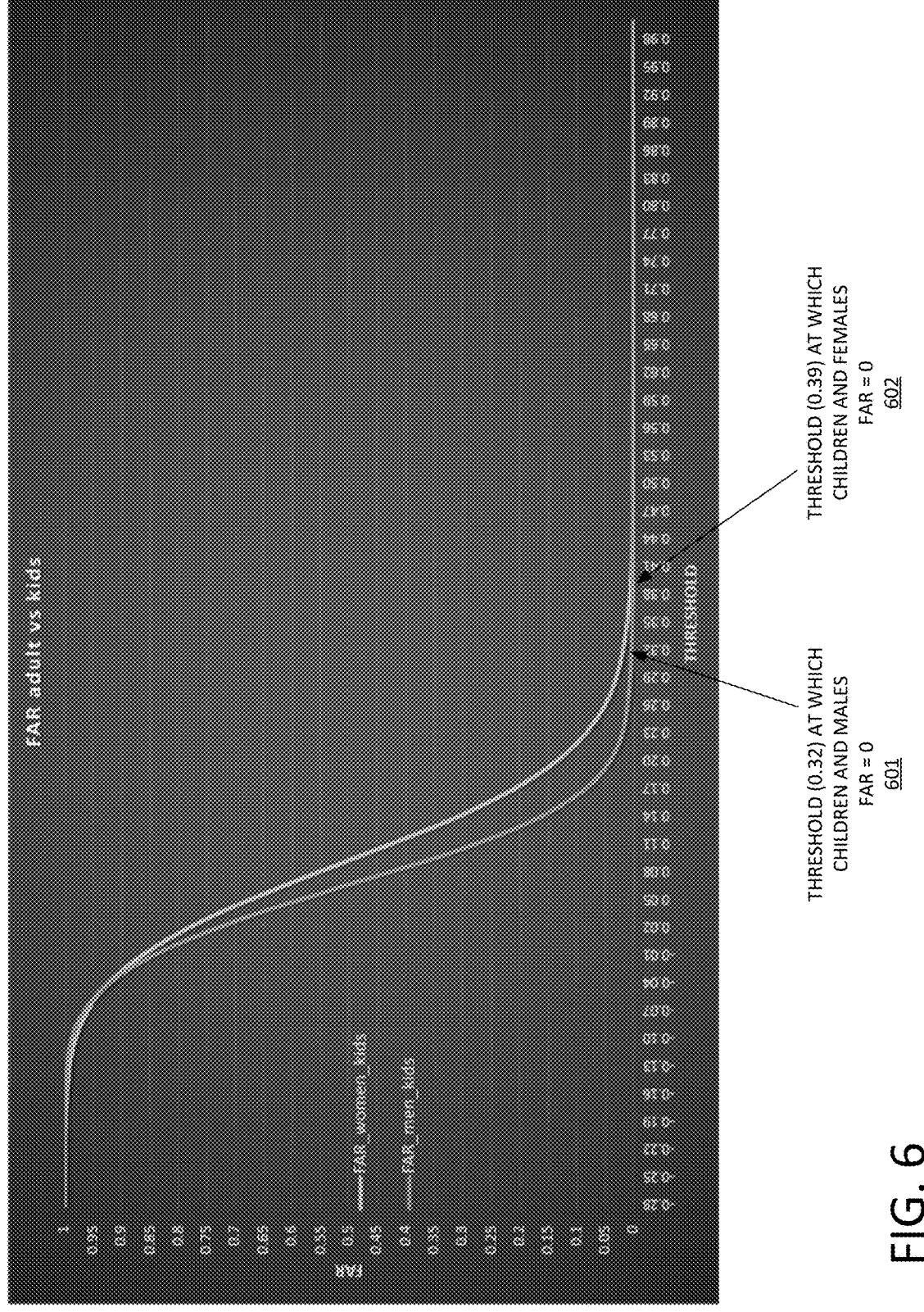
FIG. 6 shows example data.

FIG. 6 shows example data 600. The example data 600 depicts the threshold 601 at which FAR is minimized (e.g., FAR=0) for both male children and adult males is 0.32. Any other threshold used in the system depicted herein would have increased FAR for male children and adult males. For example, the threshold 602 at which FAR is minimized (e.g., FAR=0) for female children and adult females is 0.39. Any other threshold used in the system depicted herein would have increased FAR for female children and adult females.

FIG. 7 shows an example method 700. The method 700 of FIG. 7, may be performed by any device, for example, by any of the devices depicted in FIGS. 1-6 or described herein. While each step in the method 700 of FIG. 7 is shown and described separately, multiple steps may be executed in a different order than what is shown, in parallel with each other, or concurrently with each other. At step 710, a gender associated with a voice input may be determined. The gender may be determined based on data associated with the voice input. The determining the gender may be based on at least one of a machine learning classifier or a neural network. The data may be processed by the machine learning classifier or the neural network.

At step 720, based on the gender being associated with a female voice, a first confidence threshold. A second confidence threshold associated with a male voice may also be determined. At step 730, a confidence value that the voice input was received from a user (e.g., a confidence value that the speaker of the voice input has been identified) may be determined based on the voice input.

At step 740, the system may determine, based on the confidence value satisfying the first confidence threshold, to send an indication that the voice input was received from the user. The confidence thresholds may indicate a degree of accuracy needed to match the data with a voice. The confidence thresholds may minimize a FAR or an FRR associated with a determined voice (e.g., the identity of the speaker of the voice input). The confidence thresholds may cause an equal error rate for the FAR and the FRR. For example, different confidence threshold values may be needed for an accurate match if the captured audio is determined to be a male voice or a female voice. The data may also indicate an age, and the system may determine the confidence threshold based on the age.

The determined user may be further based on comparison to stored information. For example, the stored information may comprise an implicit user fingerprint comprising one or more features associated with the user. The implicit user fingerprint may be generated based on another voice input during an enrollment procedure. The other voice input may comprise at least one of a previous voice input or an enrollment command comprising one or more words. The implicit user fingerprint may be generated using an unsupervised machine learning algorithm such as a clustering algorithm. A command may also be determined based at least in part on the first confidence threshold. Based on the determined user and/or determined command, an action may be taken. For example, the action may comprise at least one of: verifying the user's identity, selecting content, personalizing content, responding to a system query, etc. At step 750, the system may send, based on determining to send the indication, the indication.

FIG. 8 shows an example method 800. The method 800 of FIG. 8, may be performed by any device, for example, by any of the devices depicted in FIGS. 1-6 or described herein. While each step in the method 800 of FIG. 8 is shown and described separately, multiple steps may be executed in a different order than what is shown, in parallel with each other, or concurrently with each other. At step 810, a gender associated with a voice input may be determined. The gender may be determined based on data associated with the voice input. The determining the gender may be based on at least one of a machine learning classifier or a neural network. The data may be processed by the machine learning classifier or the neural network.

At step 820, a first confidence threshold or a second confidence threshold may be selected based on the gender. The selection may be based on the first confidence threshold being associated with a female voice and the second confidence threshold being associated with a male voice. The confidence thresholds may indicate a degree of accuracy needed to match the data with a voice. The confidence thresholds may minimize a FAR or an FRR associated with a determined voice (e.g., the determined identity of the speaker of the voice input) or a determined command. The confidence thresholds may cause an equal error rate for the FAR and the FRR. For example, different confidence threshold values may be needed for an accurate match if the captured audio is determined to be a male voice or a female voice. The data may also indicate an age, and the system may determine the confidence threshold based on the age.

At step 830, a confidence value that the voice input was received from a user (e.g., a confidence value that the speaker of the voice input has been identified) may be determined based on the voice input. At step 840, the system may determine, based on the confidence value satisfying the selected first confidence threshold or the second confidence threshold, to send an indication that the voice input was received from the user. The determined user may be further based on comparison to stored information. For example, the stored information may comprise an implicit user fingerprint comprising one or more features associated with the user. The implicit user fingerprint may be generated based on another voice input during an enrollment procedure. The other voice input may comprise at least one of a previous voice input or an enrollment command comprising one or more words. The implicit user fingerprint may be generated using an unsupervised machine learning algorithm such as a clustering algorithm. A command may also be determined based at least in part on the first confidence threshold. Based on the determined user and/or determined command, an action may be taken. For example, the action may comprise at least one of: verifying the user's identity, selecting content, personalizing content, responding to a system query, etc. At step 850, the system may send, based on determining to send the indication, the indication.

FIG. 9 shows an example method 900. The method 900 of FIG. 9, may be performed by any device, for example, by any of the devices depicted in FIGS. 1-6 or described herein. While each step in the method 900 of FIG. 9 is shown and described separately, multiple steps may be executed in a different order than what is shown, in parallel with each other, or concurrently with each other. At step 910, a voice input may be sent. The voice input may be sent via an input device. The input device may comprise a microphone associated with a computing device.

At step 920, information indicative of a command associated with the voice input may be received. The command may have been determined based on data associated with the voice input. The command may have been determined based on whether a confidence value of whether the voice input was received from a user satisfies a first confidence threshold or a second confidence threshold. The first confidence threshold or the second confidence threshold may have been selected based on a gender associated with the voice input. The first confidence threshold may be associated with a female voice, and the second confidence threshold may be associated with a male voice. The command may have been determined based in part on a machine learning algorithm. The machine learning algorithm may comprise at least one of a machine learning classifier or a neural network. The data associated with the voice input may be processed by the machine learning classifier or the neural network to determine the gender associated with the voice input. The confidence thresholds may indicate a degree of accuracy needed to match the data with the command. The confidence thresholds may minimize a FAR or an FRR associated with the command. The confidence thresholds may cause an equal error rate for the FAR and the FRR. For example, a higher confidence threshold may be needed for an accurate match if the captured audio is determined to be a male voice or a female voice. The data may also indicate an age, and the system may determine the confidence threshold based on the age.

At step 930, execution of the command may be caused. The command may be caused to be output based on the received information. The command may be further based on comparison to stored information. For example, the stored information may comprise an implicit user fingerprint comprising one or more features associated with the user. The implicit user fingerprint may be generated based on another voice input during an enrollment procedure. The other voice input may comprise at least one of a previous voice input or an enrollment command comprising one or more words. The implicit user fingerprint may be generated using an unsupervised machine learning algorithm such as a clustering algorithm. Based on the determined command, an action may be taken. For example, the action may comprise at least one of selecting content, personalizing content, responding to a system query, etc.

Figure 10:
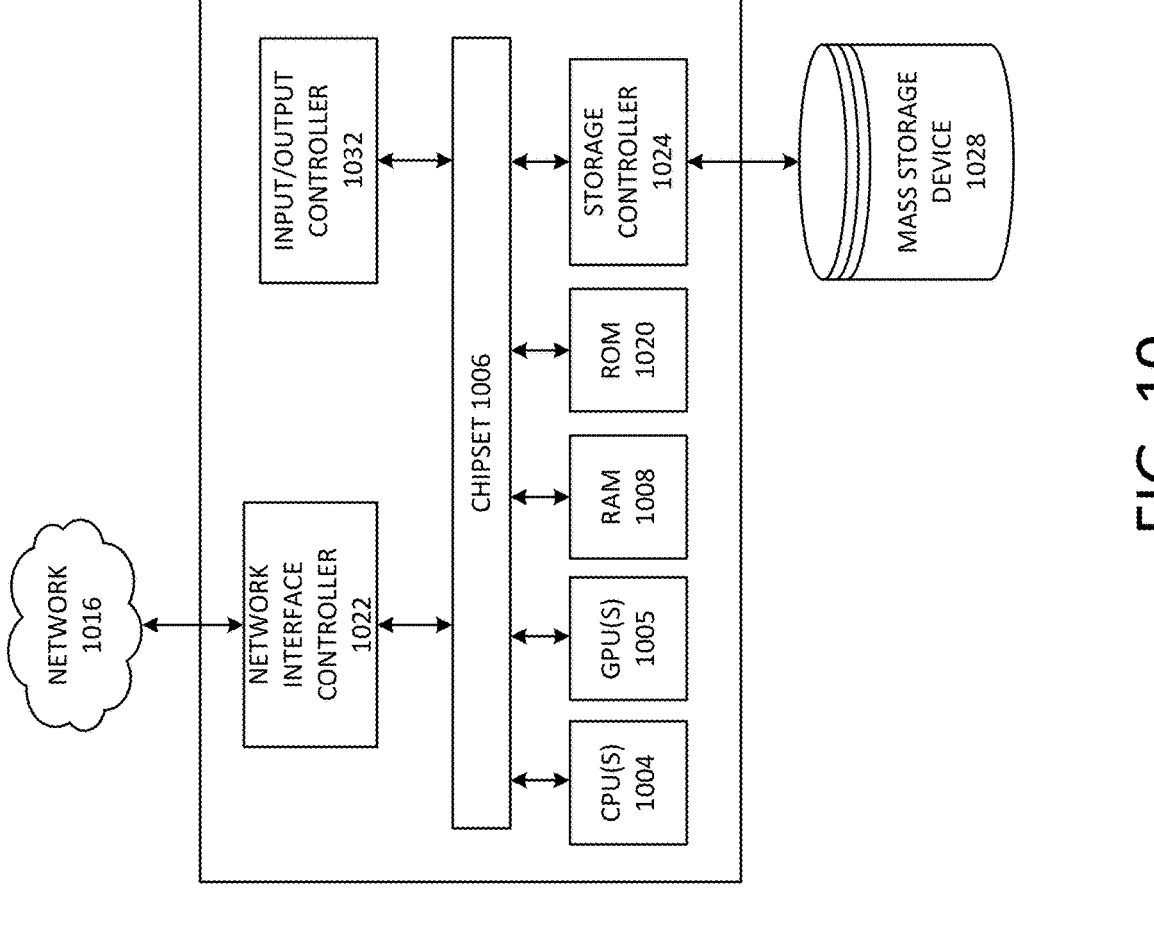
FIG. 10 shows an example computing device.

FIG. 10 depicts a computing device that may be used in various aspects, such as the servers, modules, and/or devices depicted in FIGS. 1-4. With regard to the example architecture of FIGS. 1-4, each device depicted in FIGS. 1-5 may be implemented in an instance of a computing device 1000 of FIG. 10. The computer architecture shown in FIG. 10 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 1-9.

The computing device 1000 may comprise a baseboard, or "motherboard," which is a printed circuit board to which a multitude of components or devices may be connected by way of a system bus or other electrical communication paths. One or more central processing units (CPUs) 1004 may operate in conjunction with a chipset 1006. The CPU(s) 1004 may be standard programmable processors that perform arithmetic and logical operations necessary for the operation of the computing device 1000.

The CPU(s) 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1004 may be augmented with or replaced by other processing units, such as GPU(s) 1005. The GPU(s) 1005 may comprise processing units specialized for but not necessarily limited to highly parallel computations, such as graphics and other visualization-related processing.

A chipset 1006 may provide an interface between the CPU(s) 1004 and the remainder of the components and devices on the baseboard. The chipset 1006 may provide an interface to a random access memory (RAM) 1008 used as the main memory in the computing device 1000. The chipset 1006 may provide an interface to a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein.

The computing device 1000 may operate in a networked environment using logical connections to remote computing nodes and computer systems through local area network (LAN) 1016. The chipset 1006 may include functionality for providing network connectivity through a network interface controller (NIC) 1022, such as a gigabit Ethernet adapter. A NIC 1022 may be capable of connecting the computing device 1000 to other computing nodes over a network 1016. It should be appreciated that multiple NICs 1022 may be present in the computing device 1000, connecting the computing device to other types of networks and remote computer systems.

The computing device 1000 may be connected to a mass storage device 1028 that provides non-volatile storage for the computer. The mass storage device 1028 may store system programs, application programs, other program modules, and data, which have been described in greater detail herein. The mass storage device 1028 may be connected to the computing device 1000 through a storage controller 1024 connected to the chipset 1006. The mass storage device 1028 may consist of one or more physical storage units. A storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on a mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1028 is characterized as primary or secondary storage and the like.

For example, the computing device 1000 may store information to the mass storage device 1028 by issuing instructions through a storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may read information from the mass storage device 1028 by detecting the physical states or characteristics of one or more particular locations within the physical storage units.

In addition to the mass storage device 1028 described herein, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1028 depicted in FIG. 10, may store an operating system utilized to control the operation of the computing device 1000. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 1028 may store other system or application programs and data utilized by the computing device 1000.

The mass storage device 1028 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 1004 transition between states, as described herein. The computing device 1000 may have access to computer-readable storage media storing computer-executable instructions, which, when executed by the computing device 1000, may perform the methods described in relation to FIGS. 1-9.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes¬from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects.

Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The invention claimed is:

1. A device comprising:
one or more processors; and
memory storing instructions that, when executed by the one or more processors, cause the device to:
determine, based on data associated with a voice input, a gender associated with the voice input;
determine, based on the gender being associated with a female voice, a first confidence threshold;
determine, based on the voice input, a confidence value that the voice input was received from a user;
determine, based on the confidence value satisfying the first confidence threshold, to send an indication that the voice input was received from the user; and
send, based on determining to send the indication, the indication.

2. The device of claim 1, wherein the instructions, when executed by the one or more processors, further cause the device to:
determine, based on second data associated with a second voice input, a second gender associated with the second voice input;
determine, based on the second gender being associated with a male voice, a second confidence threshold, wherein the first confidence threshold is different than the second confidence threshold;
determine, based on the second voice input, a second confidence value that the second voice input was received from a second user;
determine, based on the second confidence value satisfying the second confidence threshold, to send a second indication that the second voice input was received from the second user; and
send, based on determining to send the second indication, the second indication.

3. The device of claim 1, wherein the first confidence threshold indicates a degree of accuracy needed to match the data with the user.

4. The device of claim 1, wherein the first confidence threshold minimizes at least one of: a false acceptance rate (FAR) associated with determining that the voice input was received from the user, or a false rejection rate (FRR) associated with determining that the voice input was received from the user.

5. The device of claim 1, wherein the first confidence threshold causes an equal error rate for a false acceptance rate (FAR) associated with determining that the voice input was received from the user and a false rejection rate (FRR) associated with determining that the voice input was received from the user.

6. The device of claim 1, wherein the determining the confidence value that the voice input was received from a user is further based on a comparison to stored information, wherein the stored information comprises an implicit user fingerprint comprising one or more features associated with the user.

7. The device of claim 1, wherein the instructions, when executed by the one or more processors, further cause the device to:
generate, based on a second voice input, an implicit user fingerprint comprising one or more features associated with the user, wherein the second voice input comprises at least one of: a previous voice input or an enrollment command comprising one or more words.

8. The device of claim 1, wherein the instructions, when executed by the one or more processors, further cause the device to:
determine, based at least in part on the first confidence threshold, a command.

9. A non-transitory computer-readable medium storing instructions that, when executed, cause:
determining, based on data associated with a voice input, a gender associated with the voice input;
determining, based on the gender being associated with a female voice, a first confidence threshold;
determining, based on the voice input, a confidence value that the voice input was received from a user;
determining, based on the confidence value satisfying the first confidence threshold, to send an indication that the voice input was received from the user; and
sending, based on determining to send the indication, the indication.

10. The non-transitory computer-readable medium of claim 9, wherein the instructions, when executed, further cause:

determining, based on second data associated with a second voice input, a second gender associated with the second voice input;

determining, based on the second gender being associated with a male voice, a second confidence threshold, wherein the first confidence threshold is different than the second confidence threshold;

determining, based on the second voice input, a second confidence value that the second voice input was received from a second user;

determining, based on the second confidence value satisfying the second confidence threshold, to send a second indication that the second voice input was received from the second user; and sending, based on determining to send the second indication, the second indication.

11. The non-transitory computer-readable medium of claim 9, wherein the first confidence threshold indicates a degree of accuracy needed to match the data with the user.

12. The non-transitory computer-readable medium of claim 9, wherein the first confidence threshold minimizes at least one of: a false acceptance rate (FAR) associated with determining that the voice input was received from the user, or a false rejection rate (FRR) associated with determining that the voice input was received from the user.

13. The non-transitory computer-readable medium of claim 9, wherein the first confidence threshold causes an equal error rate for a false acceptance rate (FAR) associated with determining that the voice input was received from the user and a false rejection rate (FRR) associated with determining that the voice input was received from the user.

14. The non-transitory computer-readable medium of claim 9, wherein the determining the confidence value that the voice input was received from a user is further based on a comparison to stored information, wherein the stored information comprises an implicit user fingerprint comprising one or more features associated with the user.

15. The non-transitory computer-readable medium of claim 9, wherein the instructions, when executed, further cause:

generating, based on a second voice input, an implicit user fingerprint comprising one or more features associated with the user, wherein the second voice input comprises at least one of: a previous voice input or an enrollment command comprising one or more words.

16. The non-transitory computer-readable medium of claim 9, wherein the instructions, when executed by the one or more processors, further cause the device to:

determining, based at least in part on the first confidence threshold, a command.

17. A system comprising:

a first computing device configured to:

determine, based on data associated with a voice input, a gender associated with the voice input, determine, based on the gender being associated with a female voice, a first confidence threshold, determine, based on the voice input, a confidence value that the voice input was received from a user, determine, based on the confidence value satisfying the first confidence threshold, to send an indication that the voice input was received from the user, and send, based on determining to send the indication, the indication; and a second computing device configured to:

receive the indication.

18. The system of claim 17, wherein the first computing device is further configured to:

determine, based on second data associated with a second voice input, a second gender associated with the second voice input;

determine, based on the second gender being associated with a male voice, a second confidence threshold, wherein the first confidence threshold is different than the second confidence threshold;

determine, based on the second voice input, a second confidence value that the second voice input was received from a second user;

determine, based on the second confidence value satisfying the second confidence threshold, to send a second indication that the second voice input was received from the second user; and send, based on determining to send the second indication, the second indication.

19. The system of claim 17, wherein the first confidence threshold minimizes at least one of: a false acceptance rate (FAR) associated with determining that the voice input was received from the user, or a false rejection rate (FRR) associated with determining that the voice input was received from the user.

20. The system of claim 17, wherein the first confidence threshold causes an equal error rate for a false acceptance rate (FAR) associated with determining that the voice input was received from the user and a false rejection rate (FRR) associated with determining that the voice input was received from the user.

* * * * *